(12) United States Patent
Mädler et al.

(10) Patent No.: US 11,511,369 B2
(45) Date of Patent: Nov. 29, 2022

(54) METHOD FOR PRODUCING AN OVERLAP COMPOSITE MATERIAL FROM SHEET METAL

(71) Applicant: Doduco Solutions GmbH, Pforzheim (DE)

(72) Inventors: Ralph Mädler, Fulda (DE); Daniel Schindler, Stutensee (DE); Le Huu Bao, Niefern-Öschelbronn (DE); Michael Schuckhardt, Birkenfeld (DE)

(73) Assignee: Doduco Solutions GmbH, Pforzheim (DE)

( * ) Notice: Subject to any disclaimer, the term of this patent is extended or adjusted under 35 U.S.C. 154(b) by 78 days.

(21) Appl. No.: 16/798,745

(22) Filed: Feb. 24, 2020

(65) Prior Publication Data

US 2020/0189023 A1   Jun. 18, 2020

Related U.S. Application Data

(63) Continuation of application No. PCT/EP2018/072739, filed on Aug. 23, 2018.

(30) Foreign Application Priority Data

Aug. 28, 2017   (DE) .................... 10 2017 119 677.3

(51) Int. Cl.
*B23K 20/04*  (2006.01)
*B23K 33/00*  (2006.01)
(Continued)

(52) U.S. Cl.
CPC .......... *B23K 20/04* (2013.01); *B23K 20/2333* (2013.01); *B23K 33/004* (2013.01);
(Continued)

(58) Field of Classification Search
None
See application file for complete search history.

(56) References Cited

U.S. PATENT DOCUMENTS 3,301,994 A * 1/1967 Seeloff .................. B23K 37/08
219/78.14
3,313,911 A * 4/1967 Seelofff ............... B23K 11/061
219/105

(Continued)

FOREIGN PATENT DOCUMENTS

DE        101 49 183 A1     4/2003
DE    102010027604 A1 *   2/2011   ............. B23K 20/00
(Continued)

*Primary Examiner* — Devang R Patel
(74) *Attorney, Agent, or Firm* — Hackler Daghighian Martino & Novak

(57) ABSTRACT

A method for producing an overlap composite material from sheet metal is described, wherein a first sheet of a first metal and a second sheet of a second metal, which has a lower strength than the first metal, are positioned one above another in an overlapping manner in an edge region, and are then joined by rolling. The first sheet has a wedge-shaped edge in cross-section. The second sheet is to be positioned with its edge on a side surface of the first sheet formed by the wedge-shaped edge. The side surface formed by the wedge-shaped edge of the first sheet has a greater width than the side surface of the edge of the second sheet positioned on the said side surface of the first sheet, and, after positioning, the sheets are joined by rolling.

14 Claims, 2 Drawing Sheets

(51) Int. Cl.
  *B32B 15/01* (2006.01)
  *B23K 20/233* (2006.01)
  *B23K 103/18* (2006.01)
  *B23K 101/18* (2006.01)
  *B23K 103/10* (2006.01)
  *B23K 103/12* (2006.01)

(52) U.S. Cl.
  CPC ...... *B32B 15/017* (2013.01); *B23K 2101/185* (2018.08); *B23K 2103/10* (2018.08); *B23K 2103/12* (2018.08); *B23K 2103/18* (2018.08)

(56) References Cited

U.S. PATENT DOCUMENTS

| | | | | |
|---|---|---|---|---|
| 5,234,154 | A * | 8/1993 | Kajiwara | B21B 1/26 |
| | | | | 228/158 |
| 5,343,010 | A * | 8/1994 | Urech | B23K 26/26 |
| | | | | 219/83 |
| 6,427,904 | B1 * | 8/2002 | Groll | B23K 20/04 |
| | | | | 228/194 |
| 7,038,160 | B2 * | 5/2006 | Witte | B23K 20/021 |
| | | | | 228/193 |
| 8,802,242 | B2 * | 8/2014 | Oda | H01M 50/543 |
| | | | | 428/653 |
| 2011/0206943 | A1 | 8/2011 | Willis et al. | |
| 2012/0027506 | A1 * | 2/2012 | Yahaba | B62D 21/11 |
| | | | | 403/270 |
| 2012/0058360 | A1 | 3/2012 | Yoshimitsu et al. | |

FOREIGN PATENT DOCUMENTS

| | | | | |
|---|---|---|---|---|
| GB | 1035439 | A * | 7/1966 | |
| JP | S60177981 | A | 9/1985 | |
| JP | 2008006496 | A * | 1/2008 | ............ B23K 20/04 |
| JP | 2008006496 | A | 1/2008 | |
| WO | 2015/043951 | A1 | 4/2015 | |

\* cited by examiner

METHOD FOR PRODUCING AN OVERLAP COMPOSITE MATERIAL FROM SHEET METAL

CROSS-REFERENCE TO RELATED APPLICATIONS

This continuation application claims priority to PCT/EP2018/072739 filed on Aug. 23, 2018 which has published as WO 2019/042855 A1 and also the German application number 10 2017 119 677.3 filed on Aug. 28, 2017, the entire contents of which are fully incorporated herein with these references.

DESCRIPTION

Field of the Invention

The invention is based on a method for producing an overlap composite material from sheet metal with the features specified in the preamble of claim 1, as is of known art from WO 2015/043951 A1. In the electrical industry, for example, overlapping composite materials made of copper and aluminium are used when heavy and expensive copper has to be partly replaced by lighter and more cost-effective aluminium.

Background of the Invention

A problem in the production of such overlap material composites is adhesion between the two sheets. This problem is particularly pronounced with metals such as copper or aluminium, as passivation surface layers, such as oxide layers, form very quickly on their surfaces. These interfere or impede contact between metal atoms of the joining partners that are capable of bonding.

SUMMARY OF THE INVENTION

An object of the present invention is to indicate a way in which the adhesion between the sheets used in the production of an overlap composite material can be improved.

This object is achieved by a method with the features specified in claim 1. Advantageous refinements of the invention are the subject matter of dependent claims.

In a method for producing an overlapping composite material from sheet metal according to the present invention, a first sheet of a first material and a second sheet of a second material, which has a lower strength, in particular a lower yield point, than the first material, are laid on top of one another overlapping in an edge region, and are then joined by rolling. Here the first sheet has a wedge-shaped edge in cross section, which can be formed, for example, by ablative machining of the sheet, such as by milling or grinding. The second sheet is then positioned with its edge against a side surface of the first sheet formed by the wedge-shaped edge, and is then joined by rolling. The side surface formed by the wedge-shaped edge of the first sheet has a greater width than a side surface of the edge of the second sheet, which is joined to the first sheet, so that the edge region of the second sheet is deformed more severely than the first sheet during the subsequent rolling operation.

It is important here that the edge of the second sheet is positioned against an inclined side surface of the first sheet, which is formed by its wedge-shaped edge. Thus the second sheet does not lie on a step or recess formed in the edge region of the first sheet, but rather on an inclined side surface of the wedge-shaped edge.

The inventive configuration of the relevant side surfaces of the sheets causes an increase in the shear stress and compressive stress between the two materials during the rolling process, and thus an increase in the local deformation of the edge regions due, on the one hand, to shear in the materials of the two sheets, and, on the other hand, to the improved extrusion of bondable metal atoms into the bonding zone as a result of effective compressive stresses. In particular, the rolling process achieves a considerable increase in surface area and thus a cracking of oxide layers or other passivation and covering layers in the edge regions of the two sheets.

The edge region of the second sheet is plastically deformed during the rolling over the wedge-shaped edge of the first sheet. The initially relatively narrow side surface of the second sheet is widened until the two adjacent side surfaces are of the same size. As the width of the initially relatively narrow side surface is increased by the rolling process, any oxide or other covering layers on this side surface tear open, so that the metal underneath comes to the surface and comes into contact with the first sheet. In addition, during the rolling process, the material of the edge region of the second sheet is pressed against the wedge-shaped side surface of the first sheet and flows, so to speak, onto the wedge-shaped side surface. Any passivation layers of the first sheet that may be present are torn open on the side surface, so that the metal of the first sheet underneath the passivation layers comes into contact with the metal of the second sheet and can enter into a joint with good adhesion.

Compared to the method known from WO 2015/043951 A1, this results in an improved joint between the two sheets. This is attributed to the fact that in the method known from WO 2015/043951 A1, the second sheet is not positioned on an inclined side surface, but on a step of the side surface. A higher degree of deformation is therefore achieved with the inventive method.

The inclined side surface 3 formed by the wedge-shaped edge of the first sheet 1 preferably has a width bF1 that is at least twice that of the width h02 of the side surface of the second sheet 2. Here the width of the side surface 4 is to be measured from the front face 5 of the sheet in question to its rear face 6. The width bF1 of the inclined side surface 3 corresponds to the distance between an edge 8 on a front face 7 of the sheet and an adjacent edge 9 on the rear face 10 of the sheet.

The width bF1 of the inclined side surface 3 of the wedge-shaped edge of the first sheet is generally greater, the flatter the wedge is formed. The width h02 of the side surface 4 of the second sheet is minimal if the side surface of the second sheet is at right angles to the front face 5 and rear face 6 of the sheet, and then corresponds to the thickness of the sheet. The more the side surface 4 is inclined to the front or rear faces of the sheet, the greater is the width of the side surface.

The width of the side surface of the wedge-shaped edge of the first sheet is generally greater, the flatter the wedge is formed. The width of the side surface of the second sheet is minimal if the side surface of the second sheet is at right angles to the front and rear faces of the sheet, and then corresponds to the thickness of the sheet. The more the side surface is inclined to the front or rear faces of the sheet, the greater is the width of the side surface.

In the simplest case, the relevant side surface of the second sheet can be at right angles to the front and rear faces of the sheet so that the width of the side surface corresponds to the sheet thickness and is a minimum. However, better results can be achieved by slightly enlarging the side surface of the second sheet, that is to say, by inclining it slightly. The second sheet then has an edge region in which the sheet thickness decreases from the front edge, which is positioned on the wedge-shaped edge of the first sheet, to the rear edge of the edge region. Here it is preferable if the edge of the second sheet, as seen in cross-section, tapers over a length, to be measured in the plane of the sheet, which is not more than a quarter of the maximum thickness of the second sheet, preferably over a length that is between one fifth and one twentieth of the maximum thickness of the second sheet. The side surface can, for example, subtend an angle of 80° to 89°, in particular 86° to 89°, with a front face of the second sheet facing the side surface of the first sheet. However, the side surface does not have to be designed as a flat surface, but can, for example, also be a curved surface, or can be composed of a plurality of flat surfaces.

In an advantageous refinement of the invention provision is made for the side surface of the wedge-shaped edge of the first sheet to have a width that is more than twice the thickness of the first sheet. The side surface can, for example, have a width that is two to four times the thickness of the first sheet.

The side surface formed by the wedge-shaped edge of the first sheet can be a flat surface that encloses together with a rear face of the first sheet an acute angle, for example an angle between 10° and 30°, in particular between 15° and 25°. However, such a shape is not optimal, since in an end section of such a wedge the ratio between the thickness of the stronger material and the thickness of the softer material becomes less and less favourable and thus the stronger metal is deformed less and less. An advantageous refinement of the invention therefore provides for the wedge-shaped edge to have a thickness that decreases in cross-section from a starting point to an end at the tip of the wedge, wherein the thickness in the end section decreases faster per unit length than in a main section adjacent to the end section. This can be achieved, for example, by blunting the edge between the rear face of the first sheet and the side surface. As seen in cross-section, the tip of the wedge is therefore blunted.

The side surface of the wedge-shaped edge of the first sheet can be shaped as a curved surface. A simple way to create a suitable side surface is to bound it with a plurality of flat surfaces. For example, a main section of the side surface can be bounded by a first flat surface which subtends an angle of between 10° and 30°, in particular between 15° and 25°, with the rear face of the first sheet, and an adjacent end section can be bounded by a steeper descending curve, or by a surface, for example a surface that subtends an angle of between 25° and 50°, in particular between 35° and 45°, with the rear face of the first sheet. It is advantageous if, in a region adjacent to the main section, the end section initially slopes only slightly more steeply than the main section, for example if it subtends an angle of 35° to 45° with the rear face of the first sheet, and only at the end of the end section is a greater angle subtended with the rear face of the sheet.

The thickness of the wedge-shaped edge in the main section is preferably reduced by at least three fifths, for example by 60% to 90%, in particular by 70% to 80%. For example, each tangent to the main section can subtend an angle of 30° or less with the plane of the sheet. Tangents to the end section of the side surface then subtend larger angles with the plane of the sheet, for example angles of 40° or more. The angle that tangents to the end section subtend with the plane of the sheet preferably increases to the tip of the wedge, for example to values of 35° or more, preferably of 35° to 45°.

In another advantageous refinement of the invention the second sheet is positioned on the wedge-shaped edge of the first sheet at a point where the edge has a thickness that is more than half the maximum thickness of the first sheet, for example between 55% and 90% of the maximum thickness of the first sheet, in particular between 70% and 90%. This point is defined by the point, or rather, the line, at which the first sheet comes into contact with the second sheet when the two sheets are oriented in parallel. Surprisingly, it is not ideal to place the second sheet on the edge of the first sheet such that half the sheet thickness is in front of the point of contact, and half behind. Better results can be obtained if the second sheet is positioned so that the distance from the point of contact to the tip of the wedge-shaped edge is greater than the distance to the base of the wedge-shaped edge. Here the second sheet can be positioned on the first sheet such that the second sheet overlaps the starting point of the wedge-shaped edge. However, better results can often be achieved if—as seen in cross-section—an initial region of the wedge-shaped edge of the first sheet does not overlap with the second sheet before the rolling process begins, for example this initial region, which does not overlap with the second sheet, can have a width of between one fifth and one half of the thickness of the first sheet, in particular between two fifths and one half of the thickness of the first sheet.

The first sheet can, for example, consist of copper or a copper-based alloy. The second sheet can, for example, consist of aluminium or an aluminium-based alloy. Aluminium has a much lower strength than copper and can therefore be plastically deformed more easily than copper by the rolling process.

In a further advantageous refinement of the invention provision is made for the thickness of the overlapping composite material produced not to exceed 60% of the thickness of the first sheet before the rolling process. The thickness of the overlap composite material can, for example, be half or less of the thickness of the first sheet before the rolling process, in particular 30% to 40%. The sheets are therefore severely plastically deformed during the rolling process, which is advantageous for good adhesion in the overlapping edge region.

The sheets used preferably have the same thicknesses within their manufacturing tolerances. However, it is also possible to use sheets of different thicknesses. In general, there are no problems if the thickness of the first sheet is between twice and half the thickness of the second sheet. Preferably, however, the thicknesses of the two sheets differ only by 20% or less from one another.

BRIEF DESCRIPTION OF THE DRAWINGS

Further details and advantages of the invention are explained in an example of embodiment of the invention, with reference to the accompanying figures.

Here.

DETAILED DESCRIPTION OF THE PREFERRED EMBODIMENTS

Figure 1:
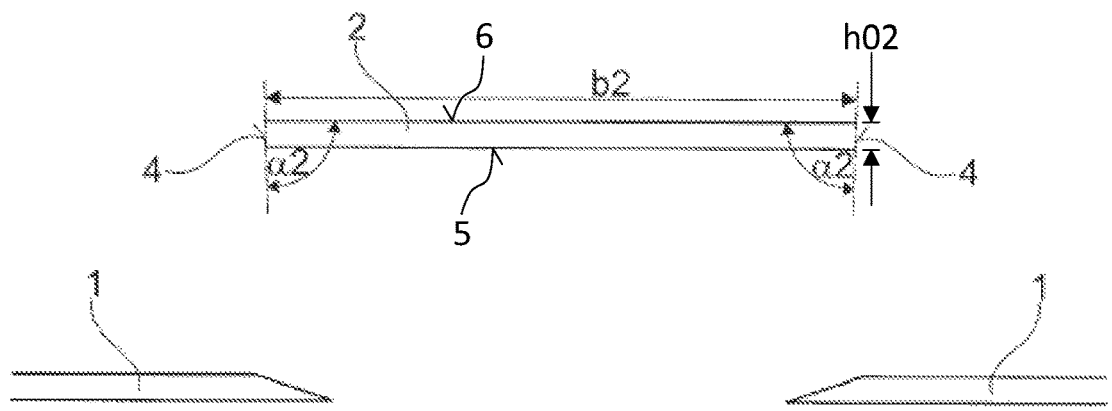
FIG. 1 shows a schematic representation of metal sheets for the production of an overlap composite material.
Figure 4:
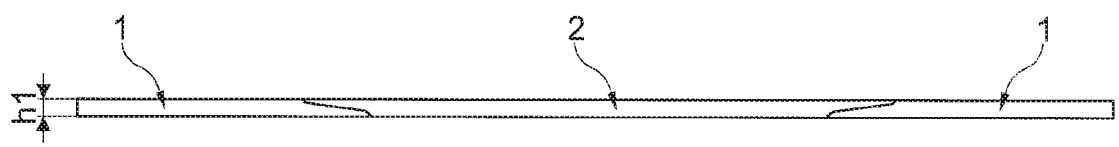
FIG. 4 shows a cross-sectional view of the overlapping composite material.

FIG. 1 shows two first sheets 1, made, for example, of copper or a copper-based alloy, and a second sheet 2, from which the overlap composite material shown in FIG. 4 is made. In the example shown, the first sheets 1 and the second sheet 2 have the same thickness within the production tolerance. Sheets 1 and 2 can, however, also be of different thicknesses, for example, they can have thicknesses that differ from one another by 20%.

Figure 2:
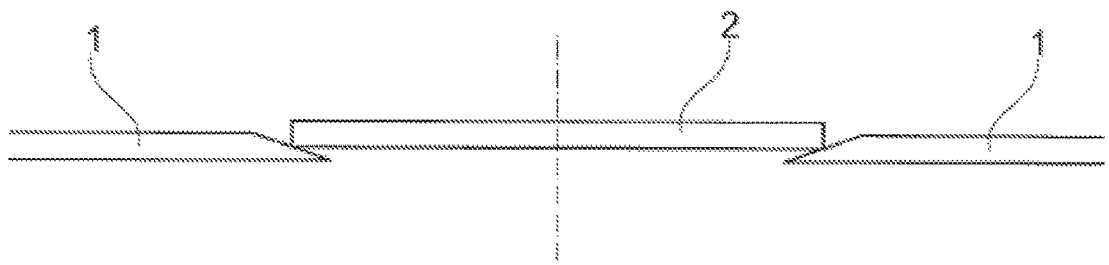
FIG. 2 shows the sheets shown in FIG. 1 before rolling.
Figure 3:
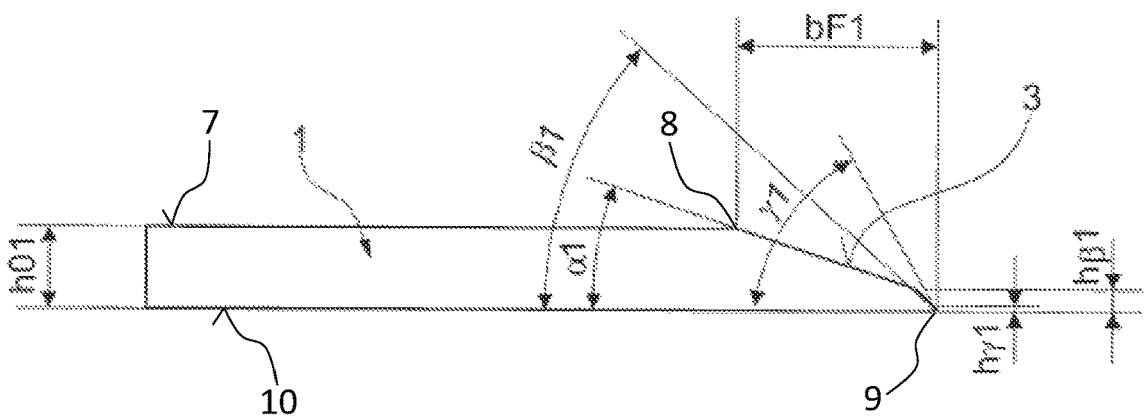
FIG. 3 shows a detail from FIG. 1.

One of the first sheets 1 of FIG. 1 is shown in detail in FIG. 3. The first sheet 1 has a wedge-shaped edge of width bF1. This wedge-shaped edge forms an inclined side surface 3, against which the second sheet 2 is positioned with its edge, as shown in FIG. 2. The width of the side surface 3 of the first sheet 1 is greater than the width of the corresponding side surface 4. In the example shown, the width of the side surface 3 is more than twice the width of the side surface 4.

The width bF1 of the wedge-shaped edge region and the width of the side surface 3 measured as the arc length are more than twice the thickness of the first sheet 1. The width of the wedge-shaped edge measured from the tip of the wedge can also be considerably more than twice the thickness of the sheet. However, a width of more than 4 times the sheet thickness usually has no advantages.

In the sectional view of FIG. 3, the wedge-shaped edge region has a blunted tip. In other words, the thickness of sheet 1 in the wedge-shaped edge region decreases faster in an end section adjacent to the tip than in a main section, which accounts for most of the width of the wedge-shaped edge region.

The side surface 3 can be convex, in other words free of hollows or indentations. In the example shown the reduction of the thickness of the first sheet 1 in the wedge-shaped edge region is strictly monotonic.

In the design example shown, the side surface in the main section is a plane that subtends an angle $\alpha 1$ with the plane of the sheet metal, which can be between 10° and 30°, in particular between 15° and 25°, for example, and in FIG. 3 is approximately 20°. In the end section, the side surface is more inclined, e.g. firstly with an angle $\beta 1$ and then with an angle $\gamma 1$. The angle $\beta 1$ can, for example, be between 25° and 50°, preferably between 35° and 45°, and in the example shown is 40°. The angle $\gamma 1$ is greater than the angle $\beta 1$, for example between 45° and 80°, in particular between 55° and 65°, and in the example shown is 60°.

In the example shown, the side surface 3 is formed by planar sub-surfaces. The side surface 3 can, however, also be curved in design. More generally, the shape of the side surface can therefore be described such that, as seen in cross-section, each tangent to the side surface 3 in the main section with the plane of the sheet metal subtends an angle of at most 30°, preferably at most 20°, while each tangent in the end section with the plane of the sheet metal subtends an angle of at least 30°, preferably at least 35°, for example 40° or more. The angle that a tangent subtends on the end section with the plane of the sheet increases towards the tip, for example to values of 50° or more. For example, in a first part of the end section, each tangent with the plane of the sheet can subtend an angle of less than 50°, e.g. 35° to 45°, and the thickness can decrease from a value $h\beta 1$ to a value $h\gamma 1$. From this thickness on, each tangent subtends an angle with the plane of the sheet of more than 50°, for example 55° to 80°. For example, the value $h\beta 1$ can be 10% to 40%, in particular 20% to 30%, of the maximum thickness of the first sheet 1, the value $h\gamma 1$ can be 5% to 15%, in particular 5% to 10%.

The main section can be directly adjacent to the end section. However, there can also be a transition section between the main section and the end section.

In the main section, the thickness of the edge section is reduced by three fifths or more, for example by 60% to 90%, in particular by 70% to 80%. The main section has a width that is at least as large as the maximum thickness of the first sheet 1. The main section preferably has a width that is at least 1.5 times the maximum thickness of the first sheet 1. The end section has a width that is, for example, between one fifth and one seventh of that of the main section.

As FIGS. 1 and 2 show, the side surface 3 formed by the wedge-shaped edge of the first sheet 1 is at least twice as wide as the side surface 4 of the edge of the second sheet 2, which is positioned against this side surface 3 of the first sheet 1. The side surface 4 is inclined. The second sheet 2 tapers as from the point at which it is positioned against the first sheet 1. In other words, the second sheet 2 has an edge which, seen in cross-section, tapers from the edge that is positioned on the wedge-shaped edge of the first sheet 1. For example, the edge can, as seen in cross-section, taper over a length $h\beta 1$, to be measured in the plane of the sheet, which is not more than a quarter of the maximum thickness of the second sheet, preferably over a length that is between a fifth and a twentieth of the maximum thickness of the second sheet. The edge region of the second sheet 2 is therefore narrow, and the thickness of the second sheet 2 reduces to zero over a width that is between one fifth and one twentieth of the thickness of the sheet 2.

The side surface 4 can be a flat surface that subtends an angle $\alpha 2$ of 80° to 89° with the plane of the sheet, e.g. 86° to 89°. The side surface 4 can, however, also be curved.

FIG. 2 shows how the sheets 1, 2 are positioned together. The second sheet 2 is positioned on the wedge-shaped edge of the first sheet 1, preferably at a point at which the edge 4 has a thickness h02 that is more than half the maximum thickness h01 of the first sheet 1, for example between 70% and 90%. In FIG. 2, the second sheet 2 touches the side surface 3 of the first sheet 1 at a point where the thickness of sheet 1 is between 85% and 90% of the maximum thickness h01 of the first sheet 1.

After the sheets 1, 2 have been laid against one another as shown in FIG. 2, they are joined together by rolling to form the overlapping composite material shown in FIG. 4. Sheets 1, 2 are thereby strongly deformed, so that the composite material has a thickness h1 that is typically not more than three fifths of the maximum thickness of the first sheet 1 before rolling. In the example shown, the composite material has a thickness h1 that is less than 40% of the original thickness of the first sheet 1.

Figure 5:
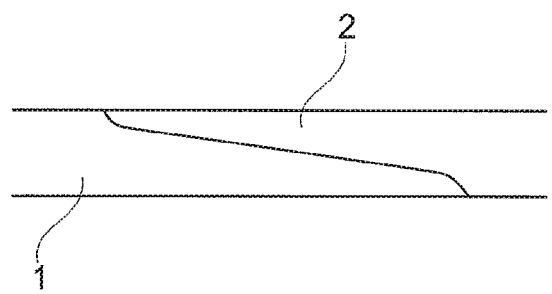
FIG. 5 shows a detail from FIG. 4.

During rolling, the edge region of the second sheet 2 is deformed particularly strongly so that it adapts to the contour of the edge region of the first sheet 1. FIG. 5 shows schematically the connection zone between the first sheet 1 and the second sheet 2 of the finished overlapping composite material.

Before the execution of the described method, the sheets 1, 2 are degreased and cleaned. The sheets 1, 2 can then be annealed so as to adjust to a defined material state, especially for the more solid material. Alternatively or additionally, the sheets 1, 2 can also be brushed before the execution of the method.

What is claimed is:

1. A method for producing an overlap composite material from sheet metal, the method comprising the steps of:
providing a first sheet made of a first metal and a second sheet made of a second metal which has a lower strength than the first metal;
positioning the sheets on top of one another in an overlapping manner in an edge region; and
joining the sheets by rolling;
wherein the first sheet has, in cross-section, a wedge-shaped edge;
wherein the second sheet, with its edge region, is positioned on an inclined side surface of the first sheet formed by the wedge-shaped edge;
wherein the inclined side surface of the first sheet is convex and free of hollows or indentations, the inclined side surface extending continuously from a front face to a rear face of the first sheet;
wherein, before joining the sheets by rolling, the inclined side surface of the first sheet has a first width corresponding to a distance measured extending parallel to the first sheet between an edge on a front face of the first sheet to an adjacent edge on a rear face of the first sheet;
wherein the edge region of the second sheet that is positioned on the inclined side surface of the first sheet forms a side edge that extends continuously from a front face of the second sheet to a rear face of the second sheet and has a second width to be measured from the front face of the second sheet to the rear face of the second sheet; and
wherein the first width is at least twice as large as the second width and the edge region of the second sheet is not wedge-shaped or inclined.

2. The method according to claim 1, wherein the wedge-shaped edge has a main section, which constitutes the major part of the length of the wedge-shaped edge region, and an end section, wherein the thickness in the main section decreases more slowly per unit length than in the end section.

3. The method according to claim 2, wherein the end section has a length that is between one fifth and one twentieth of a length of the main section.

4. The method according to claim 2, wherein in cross section, a surface of the main section encloses an angle of not more than 30° with a plane of the first sheet, the plane of the first sheet extending along a thickness of the first sheet.

5. The method according to claim 4, wherein a surface of the end section with the plane of the first sheet encloses an angle from 55° to 80°.

6. The method according to claim 1, wherein the inclined side surface formed by the wedge-shaped edge of the first sheet has the length that is at least twice that of the thickness of the side edge of the second sheet that is positioned on the said inclined side surface of the first sheet.

7. The method according to claim 1, wherein the side edge of the second sheet is positioned on the wedge-shaped edge of the first sheet at a location at which the wedge-shaped edge has a thickness that is at least half a maximum thickness of the first sheet.

8. The method according to claim 1, wherein, after joining the sheets by rolling, the wedge-shaped edge of the first sheet extends continuously from a front face to a rear face of the second sheet.

9. The method according to claim 1, wherein the first sheet is made of copper or a copper-based alloy.

10. The method according to claim 1, wherein the second sheet is made of aluminium or an aluminium-based alloy.

11. The method according to claim 1, wherein the overlap composite material has a thickness that is between 60% and 30% of a maximum thickness of the first sheet before rolling.

12. A method for producing an overlap composite material from sheet metal, the method comprising the steps of:
providing a first sheet made of a first metal and a second sheet made of a second metal which has a lower strength than the first metal;
positioning the sheets on top of one another in an overlapping manner in an edge region; and
joining the sheets by rolling;
wherein the first sheet has a thickness and a wedge-shaped edge region, said thickness decreasing in the wedge-shaped edge region;
wherein the second sheet, with its edge region, is positioned on an inclined side surface of the first sheet formed by the wedge-shaped edge region;
wherein the inclined side surface of the first sheet is convex and free of hollows or indentations, the inclined side surface extending continuously from a front face to a rear face of the first sheet;
wherein, before joining the sheets by rolling, the edge region of the second sheet is not wedge-shaped or inclined.

13. The method according to claim 12, wherein, before joining the sheets by rolling, the edge of a side surface of the second sheet is not similarly shaped as the wedge-shaped edge of the first sheet.

14. A method for producing an overlap composite material from sheet metal, the method comprising the steps of:
providing a first sheet made of a first metal and a second sheet made of a second metal which has a lower strength than the first metal;
positioning the sheets on top of one another in an overlapping manner at their respective edge regions; and
joining the sheets by rolling;
wherein the first sheet has a thickness and a wedge-shaped edge region, said thickness decreasing in the wedge-shaped edge region;
wherein the first sheet has an inclined side surface formed by the wedge-shaped edge region, said inclined side surface being convex and free of hollows or indentations, the inclined side surface extending continuously from a front face to a rear face of the first sheet,
wherein the second sheet, with its edge region, is positioned on the inclined side surface of the first sheet,
wherein, before joining the sheets by rolling, the second sheet has in its edge region that is positioned on the inclined side surface of the first sheet a side edge that extends continuously at only right angles from a front face of the second sheet to a rear face of the second sheet.

* * * * *